Aug. 4, 1959 R. F. McMAHAN, SR 2,898,163

SWIVEL

Filed Jan. 16, 1957

INVENTOR
ROY F. McMAHAN, SR.

BY W. E. Sherwood
ATTORNEY

United States Patent Office 2,898,163
Patented Aug. 4, 1959

2,898,163

SWIVEL

Roy F. McMahan, Sr., Louisville, Ky.

Application January 16, 1957, Serial No. 634,446

3 Claims. (Cl. 308—227)

This invention relates to an improved swivel and, more particularly, to a silent swivel construction adapted for use in furniture, as, for example, in swivel chairs, rotatable television cabinets, and the like.

An object of the invention is to provide a simple and strong swivel construction adapted to support a rotatable load movable in either a horizontal plane or in a plane tilted from the horizontal.

Another object is to provide a swivel which is silent in operation.

Another object is to provide a swivel which can be readily assembled and serviced.

Another object is to provide a swivel having a relatively large bearing surface which is effective at various angles of tilt.

A further object is to provide an improved bearing retaining means for swivels.

Other objects and advantages will become apparent as the description proceeds and when considered in conjunction with the accompanying drawings showing a presently preferred swivel for use in furniture.

In the drawings, Fig. 1 is a top plan view of my improved swivel detached from its load and from its support.

In accordance with my invention, I provide a swivel having two cooperating members; one of which is attachable to a support and the other of which is attachable to the load to be supported, and with a rolling contact bearing of improved design interposed between the members adjacent their outer peripheries and providing a substantially uniform, and dispersed, rather than concentrated, loading, particularly when the swivel is operating in a tilted position.

Figure 1:
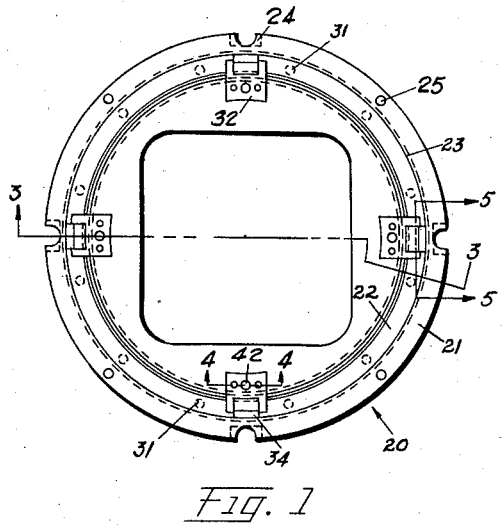
Figure 2:
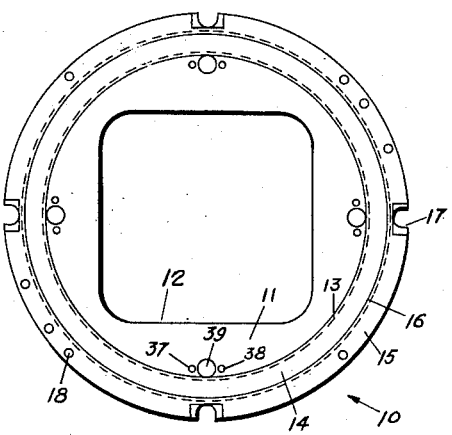
Fig. 2 is a bottom view of the swivel shown in Fig. 1.
Figure 3:
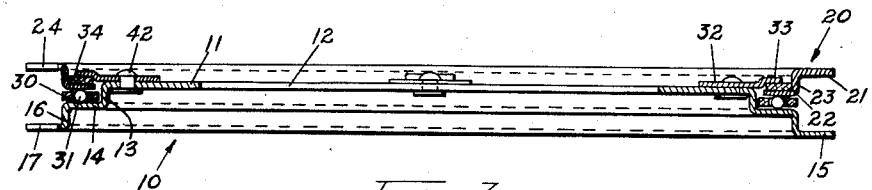
Fig. 3 is a section view taken on line 3—3 of Fig. 1 and to an enlarged scale.

Referring first to Figs. 2 and 3 a first member 10, which normally is attachable to a support (not shown), may conveniently comprise an originally round and flat sheet of metal pressed into a stepped configuration having an upper section 11 with a central aperture 12 therein. By means of the aperture a convenient arrangement for holding the parts during assembly is possible and a savings in weight of the swivel also is effected. Adjacent the periphery of the first member, a ledge having a back wall 13 and a floor 14 is formed, the floor being joined to the outer peripheral flange 15 of the member by an outer wall 16. At its extreme edge the member is provided with suitable indentations 17 for use in registering the parts. Conventional bolt holes 18 in the flange also are provided for mounting upon the support.

A second member 20, which normally is attachable to a rotatable load (not shown), may conveniently comprise an originally flat ring of sheet metal pressed into a stepped configuration having an upper peripheral flange section 21 and an inwardly extending floor 22 joined by a back wall 23 serving a purpose later to be described. This member also may be provided at its outer peripheral flange with suitable indentations 24 for use in registering the parts. Conventional bolt holes 25 in the flange also are employed for mounting upon the supported load.

Interposed between floor 22 of the second member and ledge 14 of the first member is a rolling contact bearing which conveniently may comprise an annular cage 30 having uniformly spaced steel balls 31 confined therein. As a feature of the invention, I provide a cage fabricated from a non-metallic material which permits substantially silent operation of the swivel. Any suitable material may be employed as, for example, nylon, saran, or other well known plastics, or fibre-like materials. Accordingly, the steel balls 31 may roll upon the metallic first and second members without noisy contact with the enclosing cage member 30.

Figure 4:
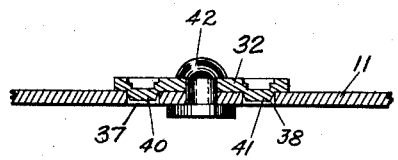
Fig. 4 is a section view taken on line 4—4 of Fig. 1 and to an enlarged scale.
Figure 5:
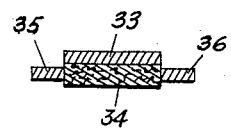
Fig. 5 is a section view of the bearing retaining means taken on line 5—5 of Fig. 1 and to an enlarged scale.

For the purpose of holding the swivel in assembled relation and for achieving a substantially uniform load sustaining function by the several balls 31, a plurality of bearing retaining means are provided. As best seen in Figs. 3 and 4, the retaining means preferably comprises a bracket anchored at one end 32 to the first swivel member and having a projecting end 33 overlying the floor 22 of the second swivel member. While the end 33 may rest directly upon the floor of the second swivel member, without departing from the invention, I prefer to interpose a cushion member 34 therebetween as shown. This cushion member may comprise a material such as employed for the bearing cage and preferably is slightly resilient, as well as being resistant to frictional wear. The bracket preferably is formed with slitted edge portions 35 and 36 with the projecting central end 33 bent upwardly and extending in a parallel plane to the edge portions, thus forming a recess in which the cushion may be housed. The central portion 33, as well as edge portions 35 and 36, do not extend completely adjacent the back wall 23 of the second swivel member, thus leaving a portion of cushion 34 exposed. If desired, a suitable lubricant can be applied to the exposed cushion should this be required after a long period of use. As seen in Fig. 5 the edge portions serve to confine the cushion against side slippage, and the rear wall of projecting end 33 together with the back wall 23 of the second swivel member confine the cushion against radial slippage.

The bracket is mounted upon the first swivel member in such a way as to prevent radial twisting of the cushion with respect to back wall 23. A preferred mounting includes spaced centering and supporting holes 37 and 38 formed in the upper section 11 of the first swivel member and with an enlarged hole 39 located between the centering holes for receiving a suitable fastening means such as a rivet, bolt or the like. The end 32 of the bracket is provided with a central hole for receiving the fastening means and with extruded projections 40 and 41 for engagement in centering holes 37 and 38 as best seen in Fig. 4. The fastening means 42, here shown as a rivet, completes the bracket assembly and a suitable number of spaced brackets of the type described is employed, preferably at diametrically opposite sides of the swivel.

In assembling the swivel, the bearing is placed in position upon the ledge of the first swivel member and the second swivel member is then rested upon the bearing. The cushions are emplaced in the brackets which then are centered with their projections 40, 41 in holes 37, 38 of the first swivel member.

Rivets 42 are then engaged thus forcing the projecting end 33 of the bracket against cushion 34 which in turn pushes the floor 22 into close engagement with the tops of balls 31. After thus being assembled, the swivel may be attached to the support and to the supported rotatable article with which it is to be employed.

With the foregoing in mind, various improved features of the swivel will now be apparent. The cushions 34, while retaining their function of holding the first and second swivel members in easily rotatable assembled relation, also permit a silent relative rotation of the floor 22 of the second member and the bracket on the first member. At the same time the brackets exert a substantially uniform loading circumferentially of the swivel and prevent chatter or noise which otherwise would occur if floor 22 lifted from contact with balls 31. Moreover, a substantially uniform loading of the balls in cage 30 intermediate the brackets is made possible and when the swivel is tilted from the horizontal, as in swivel chair usage, each of balls 31 still partakes of its normal load bearing function. Due to the relatively large diameter of the bearing cage the load carried by the second swivel member is supported at widely spaced points rather than at a central point, as in the case of many conventional swivel constructions.

Various modifications of my invention may be made without departing from the invention, as, for example, the use of roller or other types of rolling contact bearings in place of ball bearings; the omission of cushions 34 when the bracket itself is formed of a non-metallic material; and other substitutions and changes in form of the several parts as will occur to those skilled in the art. It is intended, therefore, that all matter contained in the above description or shown in the accompanying drawings shall be interpreted as illustrative and not in a limiting sense.

What I claim as new and desire to secure by Letters Patent of the United States is:

1. A swivel comprising a centrally apertured first member for attachment to a support and having a stepped configuration including a flat lower peripheral flange section, a flat upper section, a flat floor section intermediate said flat lower and upper sections and joined thereto by lower and upper circular back wall sections; a centrally apertured second member for attachment to an article to be rotatably supported and having a stepped configuration including a flat upper peripheral section, a flat lower inwardly extending floor section, and a circular back wall section joining said flat sections of said second member, an annular cage having a plurality of rolling contact bearings mounted therein, said cage having its inner periphery mounted in surrounding relation to said upper circular back wall of said first member and with the respective bearings in said cage being in contact with both floor sections of said members, and means for holding said swivel in assembled relation and including a plurality of brackets attached to and projecting radially outward from said flat upper section of said first member and in overlying relation to said inwardly projecting floor section of said second member, thereby to permit relative rotatable movement of said members and to maintain a predetermined spacing between said members and in which spacing said cage is disposed.

2. A swivel as defined in claim 1 including a cushion interposed between said brackets and the confronting side of the floor section of said second member thereby to reduce noise during movement of said swivel.

3. A swivel as defined in claim 1 including a cushion interposed between each of said brackets and the confronting side of the floor section of said second member, said brackets having spaced slits formed therein with the bracket portion intermediate said slits being displaced from the plane of the remainder of said brackets, said cushion being disposed within said bracket between the slitted portions thereof and the displaced portion thereof and with the outermost end of said cushion being in contact with the back wall section of said second member.

References Cited in the file of this patent
UNITED STATES PATENTS

| | | |
|---|---|---|
| 846,948 | Richter | Mar. 12, 1907 |
| 2,432,257 | Stetzer | Dec. 9, 1947 |
| 2,584,184 | Brown | Feb. 5, 1952 |
| 2,665,958 | Waldherr | Jan. 12, 1954 |
| 2,671,631 | Fox | Mar. 9, 1954 |
| 2,706,538 | Schumann | Aug. 19, 1955 |
| 2,726,907 | Krauss | Dec. 13, 1955 |
| 2,759,773 | Wilmer et al. | Aug. 21, 1956 |